(12) United States Patent
Sakai et al.

(10) Patent No.: US 8,482,744 B2
(45) Date of Patent: Jul. 9, 2013

(54) THIN-FILM INSPECTION APPARATUS AND METHOD THEREFOR

(75) Inventors: Satoshi Sakai, Kanagawa (JP); Youji Nakano, Nagasaki (JP); Yasuyuki Kobayashi, Kanagawa (JP); Kengo Yamaguchi, Nagasaki (JP); Akemi Takano, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 147 days.

(21) Appl. No.: 13/120,295

(22) PCT Filed: Jul. 2, 2009

(86) PCT No.: PCT/JP2009/062125
§ 371 (c)(1),
(2), (4) Date: Apr. 19, 2011

(87) PCT Pub. No.: WO2010/097972
PCT Pub. Date: Sep. 2, 2010

(65) Prior Publication Data
US 2011/0205556 A1 Aug. 25, 2011

(30) Foreign Application Priority Data
Feb. 27, 2009 (JP) .................. 2009-047361

(51) Int. Cl.
*G01B 11/28* (2006.01)
(52) U.S. Cl.
USPC .......................................... 356/630
(58) Field of Classification Search
USPC ...................................... 356/630
See application file for complete search history.

(56) References Cited

U.S. PATENT DOCUMENTS

| 5,555,472 A | 9/1996 | Clapis et al. |
| 5,883,720 A | 3/1999 | Akiyama et al. |
| 2001/0013361 A1 | 8/2001 | Fujisawa et al. |
| 2004/0246493 A1* | 12/2004 | Kim et al. ..................... 356/504 |
| 2007/0121124 A1* | 5/2007 | Nabatova-Gabain et al. 356/630 |

FOREIGN PATENT DOCUMENTS

| JP | S58-154602 | 9/1983 |
| JP | H04-172208 | 6/1992 |
| JP | 07-260437 | * 12/1994 |
| JP | H11-160028 | 6/1999 |

OTHER PUBLICATIONS

Translation of JP 07-260437, filed Dec. 8, 1994.*

* cited by examiner

*Primary Examiner* — Tu Nguyen
(74) *Attorney, Agent, or Firm* — Manabu Kanesaka; Kenneth M. Berner; Benjamin J. Hauptman

(57) ABSTRACT

A thin-film inspection apparatus calculates a film thickness of a first transparent thin film and a second transparent thin film of an inspection-target substrate including the first and second transparent thin films and a transparent conductive film on a transparent glass substrate. The apparatus has a storage section storing at least two feature-value characteristics in which at least two feature values selected from feature values in a spectral reflectance spectrum; a light irradiation section irradiating the inspection-target substrate with white light through the transparent glass substrate; a light receiving section receiving light reflected from the inspection-target substrate; and an arithmetic section obtaining measurement values of the feature values stored in the storage section from the spectral reflectance spectrum based on the reflected light received by the light receiving section, and calculating the film thickness of each of the first transparent thin film and the second transparent thin film.

8 Claims, 11 Drawing Sheets

THIN-FILM INSPECTION APPARATUS AND METHOD THEREFOR

RELATED APPLICATIONS

The present application is National Phase of International Application No. PCT/JP2009/062125 filed Jul. 2, 2009, and claims priority from Japanese Application No. 2009-047361 filed Feb. 27, 2009, the disclosure of which is hereby incorporated by reference herein in its entirety.

TECHNICAL FIELD

The present invention relates to a thin-film inspection apparatus and a method therefor, for inspecting thin films in photoelectric conversion thin-film devices used for solar cells, display units, or the like.

BACKGROUND ART

In photoelectric conversion thin-film devices, such as solar cells, it is conventionally proposed to provide a reflectance-adjustment layer for reducing reflectance, between a transparent glass substrate and a transparent conductive film in order to improve the power generation efficiency. The reflectance-adjustment layer may be a single layer or may be composed of a plurality of layers. In each layer, the refractive index of the material and the film thickness are designed based on analysis of Fresnel reflection in multiple interference films, which is known in general. The reflectance-adjustment layer has a function of eliminating differences in the in-plane reflectance spectrum, that is, hue unevenness (color unevenness), caused by in-plane film-thickness unevenness of the transparent conductive film, formed of tin oxide ($SnO_2$), ITO, or zinc oxide (gallium doped or aluminum doped).

When photoelectric conversion thin-film devices, such as solar cells, are fabricated, it is important to set the film thickness of each layer laminated on the transparent glass substrate within an appropriate range in terms of photoelectric efficiency. PTL 1 discloses a method for measuring the film thickness of each layer every time the layer is formed, when a transparent thin film (reflectance-adjustment layer) and a transparent conductive film are laminated and formed on a transparent glass substrate.

CITATION LIST

Patent Literature

{PTL 1}
PCT International Publication No. WO 00/13237 Pamphlet

SUMMARY OF INVENTION

Technical Problem

In fabrication of a photoelectric conversion thin-film device, it is usual to continuously form a transparent thin film for reflectance adjustment and a transparent conductive film on a transparent glass substrate, in a single film-formation apparatus. Therefore, the transparent glass substrate on which the transparent thin film for reflectance adjustment and the transparent conductive film have been laminated in this order is usually output from the film-formation apparatus.

The interior of the film-formation apparatus needs to be maintained at conditions appropriate for film formation, and the film-formation conditions are strictly managed; therefore, it is not preferable to measure the film thickness in the apparatus. In addition, in the film-formation apparatus, film-formation gas exists, and a high-temperature environment is usually provided as film-formation conditions. Therefore, a number of problems, such as the high-temperature environment, the gas environment, and dirt on a measurement window, need to be solved in order to introduce film-thickness measurement hardware into the film-formation apparatus; thus, it is not realistic to sequentially measure the film thickness of each thin film every time the thin film is formed in the film-formation apparatus.

Therefore, the above-described film-thickness measurement method disclosed in PTL 1 cannot be applied to a fabrication process; and there is a demand for an apparatus that measures the film thickness of each layer in a state where a transparent conductive film has been formed on transparent thin films for reflectance adjustment, in other words, after the whole process has been completed in the film-formation apparatus.

The present invention has been made in view of these circumstances, and an object thereof is to provide a thin-film inspection apparatus and a method therefor capable of measuring the film thickness of each thin film in a state where a plurality of thin films have been laminated.

Solution to Problem

In order to solve the above-described problems, the present invention employs the following solutions.

According to a first aspect, the present invention provides a thin-film inspection apparatus that calculates, for an inspection-target substrate in which a first transparent thin film and a second transparent thin film that are provided for reflectance adjustment and a transparent conductive film have been formed in this order on a transparent glass substrate, a film thickness of each of the first transparent thin film and the second transparent thin film, the apparatus including: a storage section that stores at least two feature-value characteristics in which at least two feature values selected from feature values in a spectral reflectance spectrum that are affected by a variation in the film thickness of at least one of the first transparent thin film and the second transparent thin film are each associated with the film thickness of the first transparent thin film and the film thickness of the second transparent thin film; a light irradiation section that irradiates the inspection-target substrate with white light through the transparent glass substrate; a light receiving section that receives reflected light reflected from the inspection-target substrate; and an arithmetic section that obtains measurement values of the feature values stored in the storage section, from a spectral reflectance spectrum generated based on the reflected light received by the light receiving section, and that calculates the film thickness of each of the first transparent thin film and the second transparent thin film by using the obtained measurement values of the feature values and the feature-value characteristics stored in the storage section.

According to this aspect, at least two feature values are selected from feature values in a spectral reflectance spectrum, which are affected by a variation in the film thickness of at least one of the first transparent thin film and the second transparent thin film, and the selected feature values are used to calculate the film thickness of each of the first transparent thin film and the second transparent thin film; therefore, even in a state where a thin film, such as a transparent conductive film, has been further formed on the plurality of measurement-target thin films, the film thickness of each of the measurement-target thin films can be calculated based on the reflection characteristics thereof. Thus, it is possible to be applied, for example, to fabrication lines of photoelectric conversion thin-film devices using thin films, and the efficiency of film-thickness inspection can be improved.

For example, when the film thickness of each of the thin films constituting the reflectance-adjustment layer varies, the effects of the functions (for example, of reducing reflection and of eliminating hue unevenness) expected for the reflectance-adjustment layer vary. Specifically, if the film thickness is set within a preferable range, the evaluation indices for evaluating the functions of the reflectance-adjustment layer fall within predetermined ranges. In other words, if the parameters used for evaluating the functions expected for the reflectance-adjustment layer fall within preferable ranges, it can be considered that a combination of the film thickness of the first transparent thin film and that of the second transparent thin film falls within a preferable range. Therefore, in this aspect, the parameters used for evaluating the various functions expected for the reflectance-adjustment layer are used as feature values in a spectral reflectance spectrum that are affected by a variation in the film thickness of at least one of the first transparent thin film and the second transparent thin film.

In the above-described thin-film inspection apparatus, it is preferable that the feature-value characteristics stored in the storage section include reflectance at a wavelength at which the reflectance varies according to the film thickness of the first transparent thin film, or a maximum reflectance value.

Thus, the accuracy of film-thickness measurement of the first transparent thin film can be improved.

In the above-described thin-film inspection apparatus, it is preferable that the feature-value characteristics stored in the storage section further include any of the difference between maximum reflectance and minimum reflectance at wavelengths from approximately 900 nm to approximately 1200 nm, inclusive; average reflectance at wavelengths from approximately 500 nm to approximately 900 nm, inclusive; the difference between maximum reflectance and minimum reflectance at wavelengths from approximately 550 nm to approximately 700 nm, inclusive; and minimum reflectance at wavelengths from approximately 550 nm to approximately 700 nm, inclusive.

The above-described feature values are particularly sensitive to a variation in the film thickness of at least one of the first transparent thin film and the second transparent thin film. Therefore, by performing film-thickness measurement with use of these feature values, the accuracy of film-thickness measurement of the thin films can be further improved.

The above-described difference between the maximum reflectance and the minimum reflectance at wavelengths from approximately 900 nm to approximately 1200 nm, inclusive, is a parameter used for evaluating the film thickness of the second transparent thin film and tends to become larger as the film thickness of the second transparent thin film becomes larger than a permissible film thickness, for example.

The average reflectance at wavelengths from approximately 500 nm to approximately 900 nm, inclusive, is a parameter corresponding to an evaluation amount with respect to the functions of the reflectance-adjustment layer. Specifically, since the purpose of providing the reflectance-adjustment layer is to reduce the reflectance in the central range of the spectral sensitivity of photoelectric conversion thin-film devices, such as solar cells, the functions of the reflectance-adjustment layer can be evaluated by observing the average reflectance at wavelengths from 500 nm to 900 nm, inclusive. It is preferable that this average reflectance be smaller.

The difference between the maximum reflectance and the minimum reflectance at wavelengths from approximately 550 nm to approximately 700 nm, inclusive, is a parameter related to a hue-unevenness suppression effect. When the difference in reflectance at this wavelength range is small, it is possible to suppress hue and to improve the hue-unevenness suppression effect. Further, as this difference becomes smaller, the average reflectance can be suppressed, contributing to the power generation efficiency.

The minimum reflectance at wavelengths from approximately 550 nm to approximately 700 nm, inclusive, is a parameter related to evaluation of the power generation efficiency. It is preferable that the minimum reflectance be smaller.

In the above-described thin-film inspection apparatus, the feature-value characteristics may be each expressed by using a polynomial in which the film thickness of the first transparent thin film and the film thickness of the second transparent thin film are variables; and the arithmetic section may calculate the value of x as the film thickness of the first transparent thin film and the value of y as the film thickness of the second transparent thin film when W becomes minimum in Formula (1), {Formula 1}

$$W = \sum_{j=1}^{n} (Z_j(x, y) - z_j)^2 \quad (1)$$

where $Z_j(x,y)$ indicates a calculated value of a j-th feature value when a predetermined film thickness x of the first transparent thin film and a predetermined film thickness y of the second transparent thin film are input to a feature-value characteristic corresponding to the feature value; $z_j$ indicates a measurement value of the j-th feature value; and n indicates the number of feature-value characteristics stored in the storage section.

In this way, in this aspect, each feature-value characteristic is expressed using a polynomial in which the film thickness of the first transparent thin film is a variable x and the film thickness of the second transparent thin film is a variable y, and the values of x and y that minimize the sum of squares of the difference between the measurement value and the calculated value of each feature value by the polynomial are calculated as the film thickness of the first transparent thin film and the film thickness of the second transparent thin film.

According to a second aspect, the present invention provides a thin-film inspection method for calculating, for an inspection-target substrate in which a first transparent thin film and a second transparent thin film that are provided for reflectance adjustment and a transparent conductive film have been formed in this order on a transparent glass substrate, a film thickness of each of the first transparent thin film and the second transparent thin film, the method including the steps of: obtaining in advance at least two feature-value characteristics in which at least two feature values selected from feature values in a spectral reflectance spectrum that are affected by a variation in the film thickness of at least one of the first transparent thin film and the second transparent thin film are each associated with the film thickness of the first transparent thin film and the film thickness of the second transparent thin film; irradiating the inspection-target substrate with white light through the transparent glass substrate; receiving reflected light reflected from the inspection-target substrate; obtaining measurement values of the feature values from a spectral reflectance spectrum generated based on the received reflected light; and calculating the film thickness of each of the first transparent thin film and the second transparent thin film by using each of the obtained measurement values of the feature values and the feature-value characteristics.

Advantageous Effects of Invention

According to the present invention, an advantage is afforded that the film thickness of each thin film can be measured in a state where a plurality of thin films have been laminated.

DESCRIPTION OF EMBODIMENTS

A description will be given below of a case where a thin-film inspection apparatus and a method therefor according to an embodiment of the present invention are used for thin-film inspection in a solar cell, with reference to the drawings.

Figure 1:
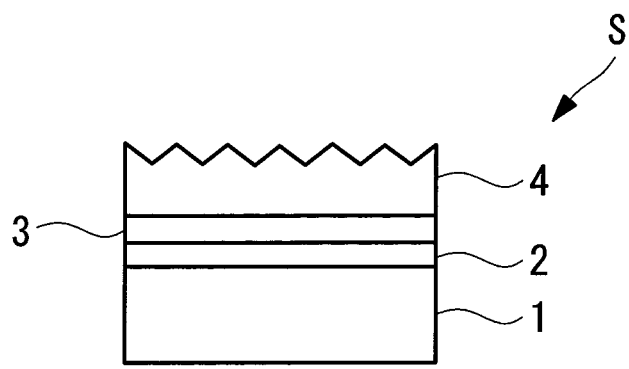
FIG. 1 is a diagram schematically showing a cross-section of an inspection-target substrate to be inspected by a thin-film inspection apparatus according to an embodiment of the present invention.

FIG. 1 is a diagram schematically showing a cross-section of an inspection-target substrate S to be inspected by the thin-film inspection apparatus according to this embodiment. As shown in FIG. 1, in the inspection-target substrate S, a first transparent thin film 2 and a second transparent thin film 3 that are used for reflectance adjustment, and a transparent conductive film 4 are formed in this order on a transparent glass substrate 1. The first transparent thin film 2 and the second transparent thin film 3 constitute a reflectance-adjustment layer.

The first transparent thin film 2 has a higher refractive index than the second transparent thin film 3 and is formed of $TiO_2$, $SnO_2$, $Ta_2O_5$, $MgO$, $Al_2O_3$, or the like, for example. The second transparent thin film 3 is formed of $SiO_2$, or the like, for example.

Furthermore, it is preferable that the film thickness of each of the first transparent thin film 2 and the second transparent thin film 3 be set so as to reduce reflection loss to obtain higher power generation efficiency.

The transparent conductive film (TCO: transparent conductive oxide) 4 is formed of ITO (indium tin oxide), zinc oxide (ZnO), tin oxide ($SnO_2$), or the like.

Next, a case where the film thickness of each of the first transparent thin film 2 and the second transparent thin film 3 in the inspection-target substrate S, having the above-described structure, is measured will be described. In this embodiment, a description will be given of a case where $TiO_2$ is used for the first transparent thin film 2 and $SiO_2$ is used for the second transparent thin film 3.

Figure 2:
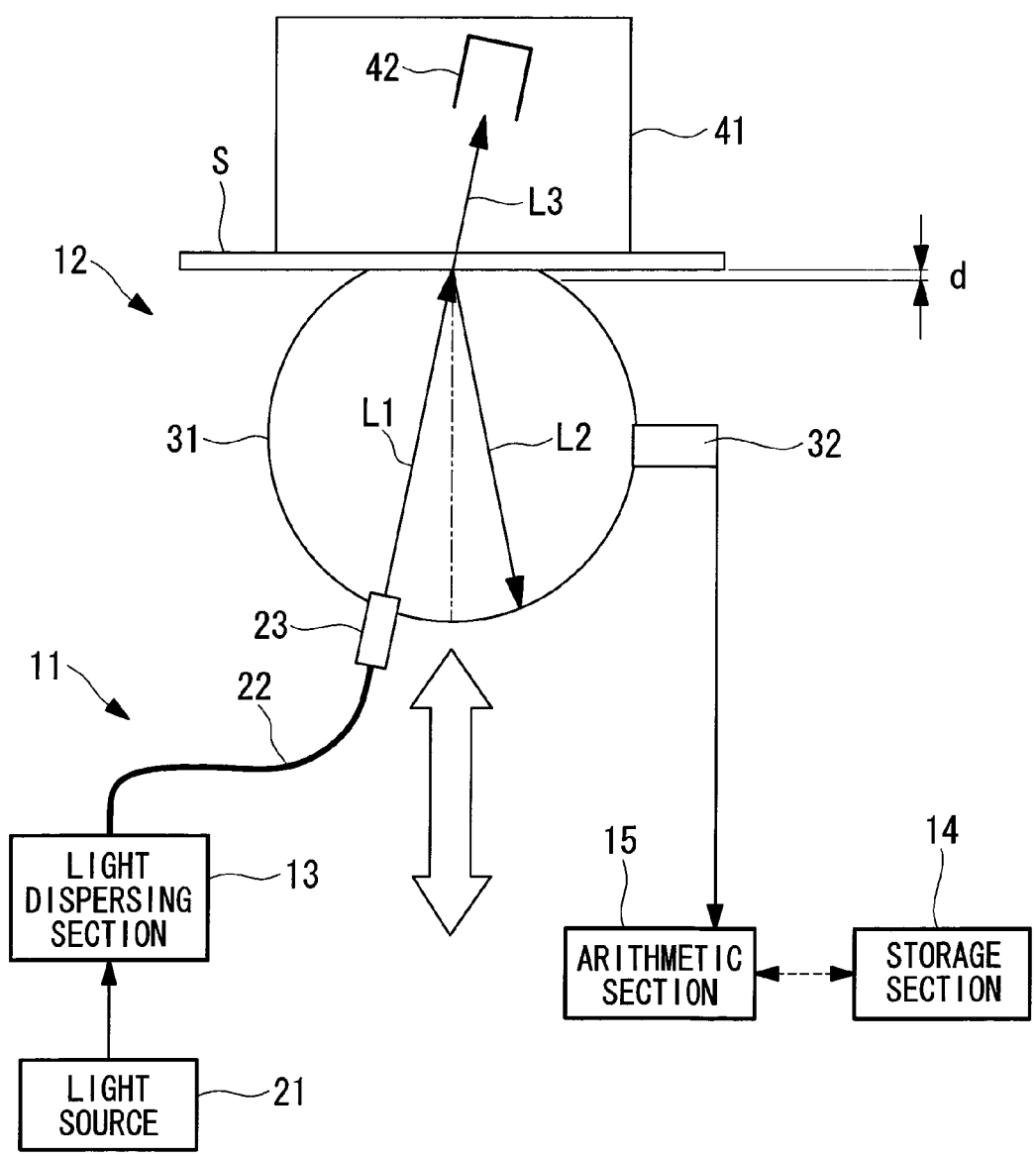
FIG. 2 is a block diagram showing, in outline, the configuration of the thin-film inspection apparatus according to the embodiment of the present invention.

FIG. 2 is a block diagram showing, in outline, the configuration of the thin-film inspection apparatus according to this embodiment. As shown in FIG. 2, the thin-film inspection apparatus includes, a light irradiation section 11, a light receiving section 12, a light dispersing section 13, a storage section 14, and an arithmetic section 15 as main components.

The light irradiation section 11 includes a light source 21, an optical fiber 22, and a light emitting end 23. The light source 21 is a lamp, for example. Furthermore, a plurality of lamps can be appropriately combined in order to cover a wider wavelength range. Examples of a lamp include a halogen lamp and a deuterium lamp. As the optical fiber 22, a fiber bundle can be used, for example. The light emitting end 23 is, for example, a collimator lens attached to the end of the optical fiber 22. The light emitting end 23 gives directivity to diffused light emitted from the optical fiber 22. Further, the light emitting end 23 is installed such that the optical axis of illumination light emitted from the light emitting end 23 enters the inspection-target substrate S at a predetermined angle, in order to prevent the specular reflection from returning to the light emitting end 23. The angle of the optical axis is set at, for example, approximately 5 degrees to approximately 10 degrees with respect to the normal direction of the inspection-target substrate S.

The light dispersing section 13 is provided in the optical path where light emitted from the light source 21 is guided to the optical fiber 22. The light dispersing section 13 spectrally disperses light emitted from the light source 21, selects light having different wavelengths time-sequentially, for example, and outputs the light to the optical fiber 22. Thus, light having wavelengths from 1500 nm to 300 nm, for example, is sequentially output.

The light receiving section 12 includes an integrating sphere 31 and a light receiving element 32, for example. The integrating sphere 31 is disposed a distance d away from the inspection-target substrate S. The distance d is optional and need not be provided. If the distance d is not provided, an elevating mechanism (not shown), for example, is used to bring the integrating sphere 31 into contact with the inspection-target substrate S during measurement, to give a finite distance d after measurement, and to transport the inspection-target substrate S. If the distance d is provided, measurement is carried out while the distance d is being maintained constant. In this case, the inspection-target substrate S may be stationary or may be being transported. The distance d is set within a range from approximately 0.5 mm to 2 mm, inclusive, for example.

The light receiving element 32 is attached on the inner wall surface of the integrating sphere 31. For the light receiving element 32, a plurality of elements can be appropriately combined in order to cover a wider wavelength band. For example, a photomultiplier and a PbS light receiving element can be combined. In this embodiment, a description is given of an example case where one light receiving element 32 is provided; however, a plurality of light receiving elements 32 may be disposed at different positions on the integrating sphere 31.

In the storage section 14, a plurality of feature-value characteristics in which a plurality of feature values are each associated with the film thickness of the first transparent thin film 2 and the film thickness of the second transparent thin film 3 are stored. The details of the feature-value characteristics will be described later.

The arithmetic section 15 generates a spectral reflectance spectrum based on an electrical signal output from the light receiving element 32 and the information about the wavelength selected by the light dispersing section 13, obtains the measurement values of the feature values from this spectral reflectance spectrum, and calculates the film thickness of the first transparent thin film 2 and that of the second transparent thin film 3 by using the obtained measurement values of the feature values and the feature-value characteristics stored in the storage section 14.

The arithmetic section 15 is configured by, for example, a CPU (central processing unit), a ROM (read only memory), and a RAM (random access memory), which are not shown. A program for realizing a series of processes, to be described later, is recorded in the ROM. The CPU reads this program into the RAM or the like and executes information processing and calculation processing, thereby realizing various types of processing, to be described later. The film thicknesses calculated by the arithmetic section 15 are output to a display unit (not shown), for example, and the measurement results are displayed on the display unit.

In this configuration, light emitted from the light source 21 is guided to the light dispersing section 13, in which light having respective wavelengths is selected time-sequentially, and is then guided to the optical fiber 22. The light guided to the optical fiber 22 is emitted from the light emitting end 23 toward the inspection-target substrate S. Illumination light L1 emitted from the light emitting end 23 enters a substrate surface of the inspection-target substrate S at an angle, part thereof is transmitted through the inspection-target substrate S, and part thereof is reflected. Transmitted light L3 is absorbed by a nonreflecting mechanism (a so-called light trap) 42 that is provided inside a light shielding box 41 disposed on the upper surface side of the inspection-target substrate S. Since it is a structure that stray light is not emitted to the inside of the light shielding box 41, stray light is not returned to the integrating sphere 31 side. The light shielding box 41 is provided in order to block external light such that external stray light is prevented from reaching the light receiving element 32.

On the other hand, reflected light L2 reflected at the inspection-target substrate S is reflected on the inner wall of the integrating sphere 31 many times and then reaches the light receiving element 32. The light reaching the light receiving element 32 is photoelectrically converted by the light receiving element 32, and an electrical signal corresponding to the amount of received light is generated and output to the arithmetic section 15.

The arithmetic section 15 generates a spectral reflectance spectrum based on the electrical signal output from the light receiving element 32 and the information sent from the light dispersing section 13, obtains the measurement values of the feature values from the spectral reflectance spectrum, and calculates the film thickness of the first transparent thin film 2 and that of the second transparent thin film 3 based on the obtained measurement values of the feature values and the feature-value characteristics stored in the storage section 14.

In the above-described configuration example, a description has been given of a case where the integrating sphere 31 is used; however, a configuration in which the integrating sphere 31 is not provided may be employed. In that case, the light receiving element 32 is disposed at a position where the reflected light L2 can be directly received.

Next, the above-described feature values will be described.

As described above, the thin-film inspection apparatus of this embodiment measures the film thickness of each thin film in a state where a plurality of thin films, namely, the first transparent thin film 2 and the second transparent thin film 3, have been laminated on the glass substrate. Therefore, feature values in the spectral reflectance spectrum that are affected by a variation in the film thickness of each thin film were studied. The feature values are shown below in Table 1.

TABLE 1

| FEATURE VALUE NUMBER (j) | FEATURE VALUE |
| --- | --- |
| 1 | REFLECTANCE AT WAVELENGTH OF 380 nm |
| 2 | DIFFERENCE BETWEEN MAXIMUM REFLECTANCE AND MINIMUM REFLECTANCE AT WAVELENGTHS FROM 900 nm TO 1200 nm, INCLUSIVE |
| 3 | AVERAGE REFLECTANCE AT WAVELENGTHS FROM 500 nm TO 900 nm, INCLUSIVE |
| 4 | DIFFERENCE BETWEEN MAXIMUM REFLECTANCE AND MINIMUM REFLECTANCE AT WAVELENGTHS FROM 550 nm TO 700 nm, INCLUSIVE |
| 5 | MINIMUM REFLECTANCE AT WAVELENGTHS FROM 550 nm TO 700 nm, INCLUSIVE |
| 6 | MAXIMUM REFLECTANCE VALUE AT WAVELENGTHS FROM 300 nm TO 400 nm, INCLUSIVE |

The above-described feature values are all parameters (feature values) whose values vary in accordance with a variation in the film thickness of at least one of the first transparent thin film 2 and the second transparent thin film 3. These feature values are selected because they are particularly sensitive to a variation in the film thickness of at least one of the first transparent thin film and the second transparent thin film.

Therefore, when these feature values are used for film-thickness measurement, the accuracy of the film-thickness measurement of the thin films can be further improved.

In this embodiment, the film thicknesses are calculated by using at least two feature values among these feature values. Since "reflectance at a wavelength of 380 nm", which is the first feature value, and "the maximum reflectance value", which is the sixth feature value, mean substantially the same, there is no need to use both of them, and it is sufficient to use either one of them.

Next, the feature-value characteristics for the above-described feature values are generated in the following procedure.

First, a plurality of specimens are prepared that have a structure similar to the inspection-target substrate S and that have different film-thickness combinations of the first transparent thin film 2 and the second transparent thin film 3. The film thicknesses in each specimen are measured when part of the specimen is cut off and observed using a TEM (transmission electron microscope).

After the plurality of specimens, for each of which the film thicknesses are known, are prepared in this way, white light is irradiated to each specimen from the transparent glass substrate side, and the reflected light of the white light is measured and analyzed. The irradiation of the white light, the reception of the reflected light, and the analysis of the reflected light are performed by using the above-described components of the thin-film inspection apparatus. By using the same components in this way, it is possible to obtain high-accuracy feature-value characteristics and to achieve a reduction in measurement error caused by differences in apparatus components.

Figure 3:
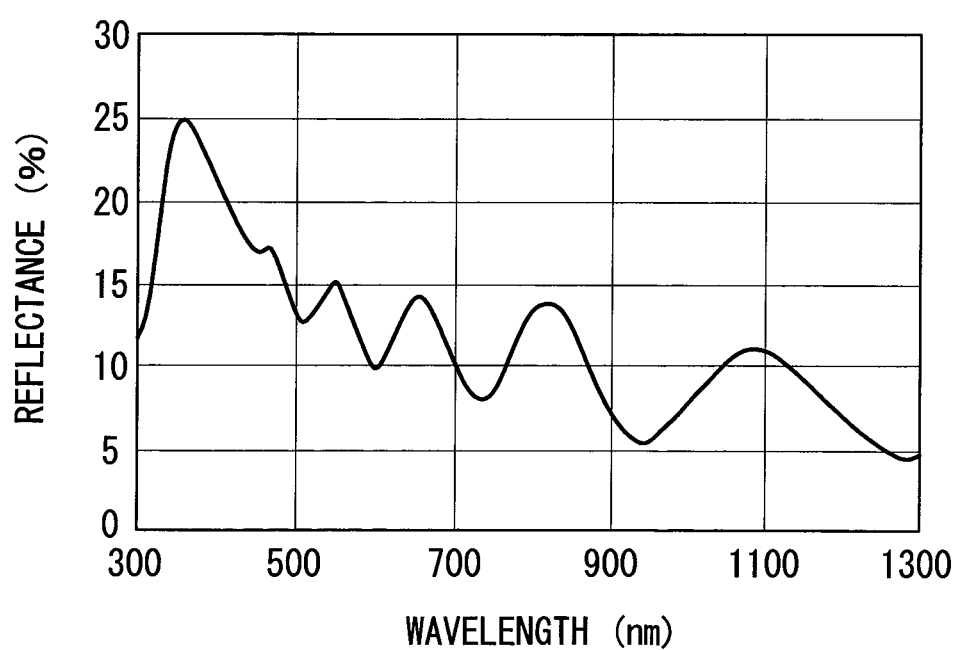
FIG. 3 is a diagram showing an example spectral reflectance spectrum.

FIG. 3 shows an example spectral reflectance spectrum. From this spectral reflectance spectrum, the respective feature values, specifically, the values of the above-described feature values shown in Table 1, are obtained. Then, the same test is performed for each specimen to obtain the feature values of the specimen.

Next, based on the values of the obtained feature values and the film thickness of each of the first transparent thin film 2 and the second transparent thin film 3 in each specimen, a feature-value characteristic that shows the relationship between each of the feature values and the film thickness of each of the first transparent thin film 2 and the second transparent thin film 3 is generated for each of the feature values. For example, the feature-value characteristic is expressed by a correlation equation using a polynomial in which the film thickness of the first transparent thin film 2 and the film thickness of the second transparent thin film 3 are variables.

Formula (2) shown below is an example correlation equation. Here, a quadratic polynomial is used.

{Formula 2}

$$Z_j(x,y) = A_j + B_j x + C_j x^2 + D_j y^2 + E_j y^2 + F_j xy \qquad (2)$$

In Formula (2), x indicates the film thickness of the first transparent thin film 2, y indicates the film thickness of the second transparent thin film 3, and $A_j$ to $F_j$ indicate coefficients for the j-th feature value in the correlation equation.

After the feature-value characteristics are obtained for the respective feature values, in this way, the feature-value characteristics are stored in the storage section 14. If feature values to be used for inspection are determined in advance among the feature values shown in Table 1, the above-described prior test may be performed only for those feature values to be used for inspection, to prepare the feature-value characteristics.

Figure 4:
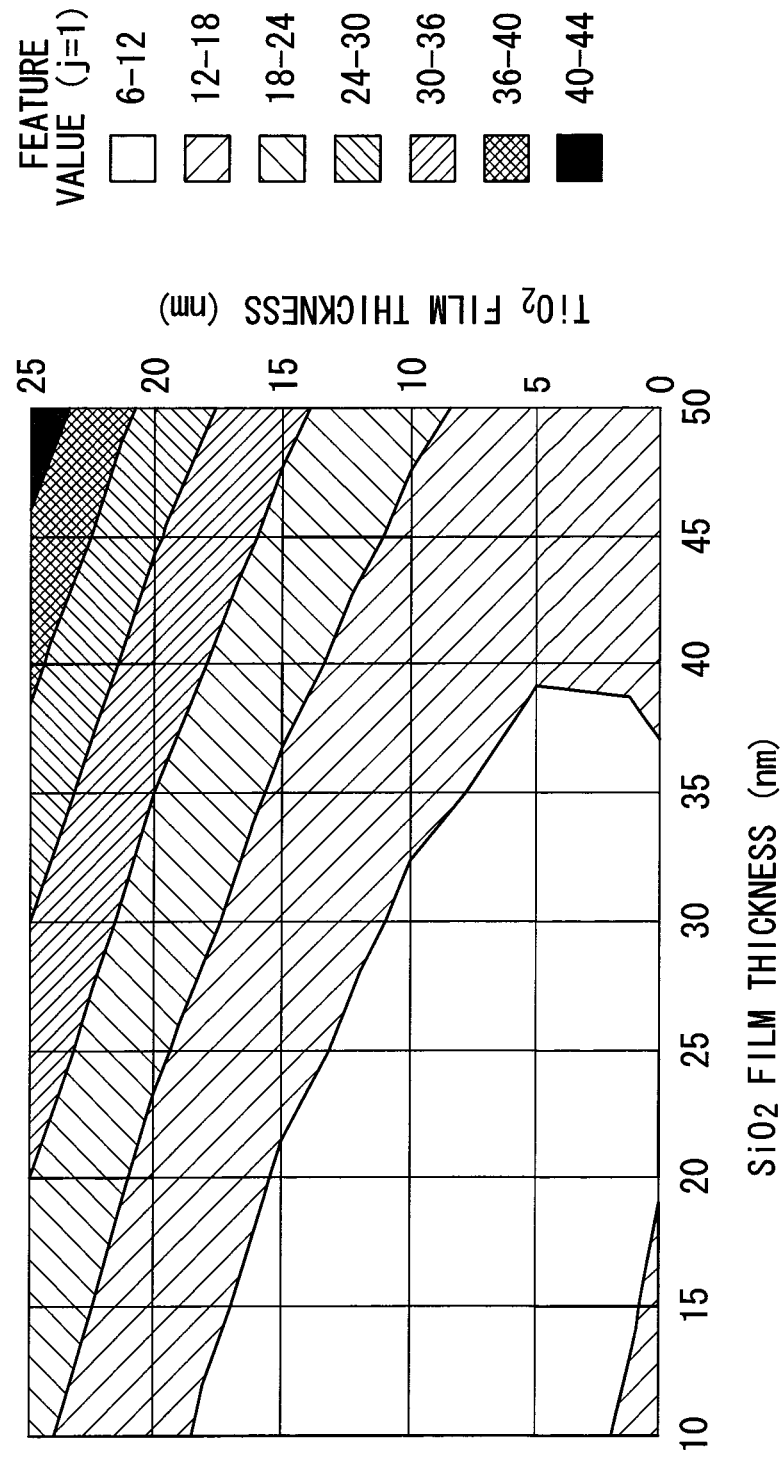
FIG. 4 is a diagram showing an example feature-value characteristic for a feature value "reflectance at a wavelength of 380 nm".
Figure 5:
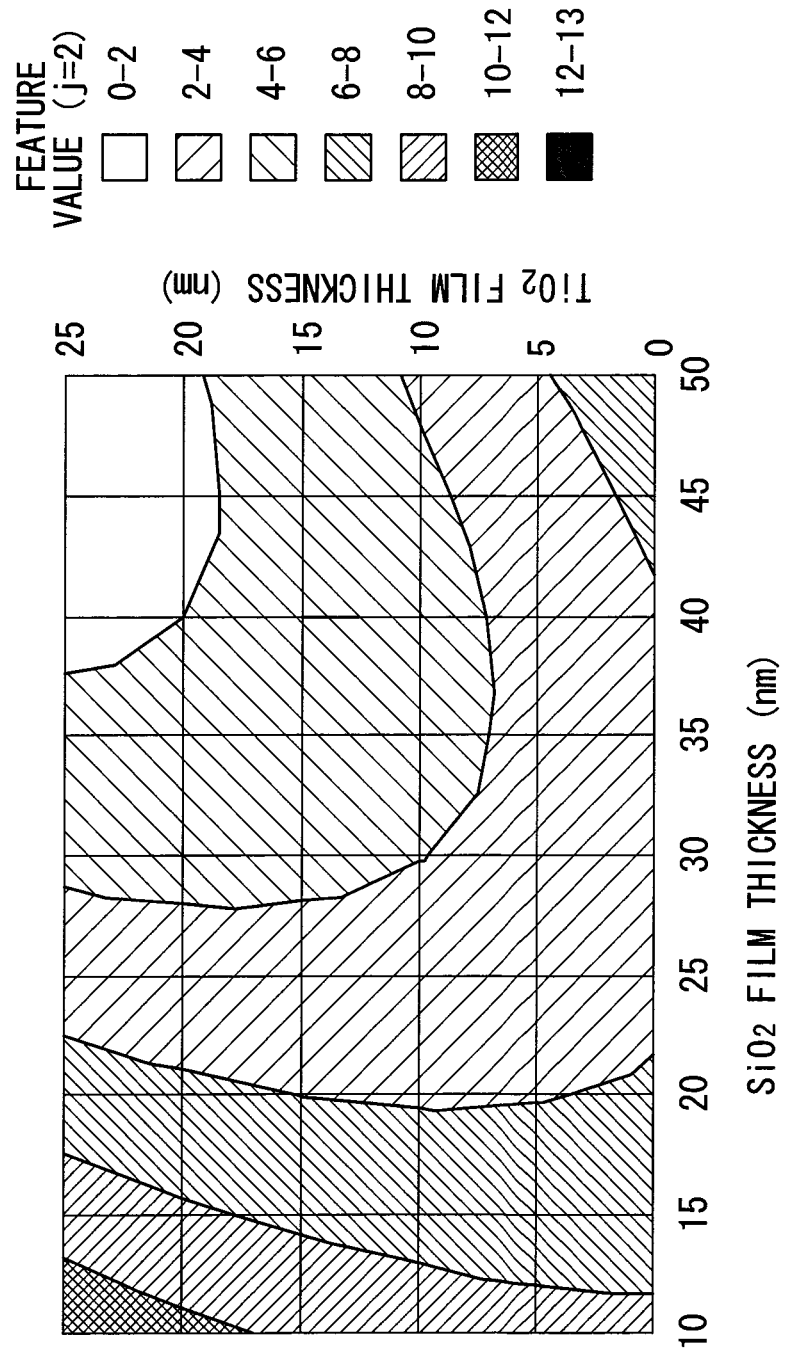
FIG. 5 is a diagram showing an example feature-value characteristic for a feature value "the difference between the maximum reflectance and the minimum reflectance at wavelengths from 900 nm to 1200 nm, inclusive".
Figure 6:
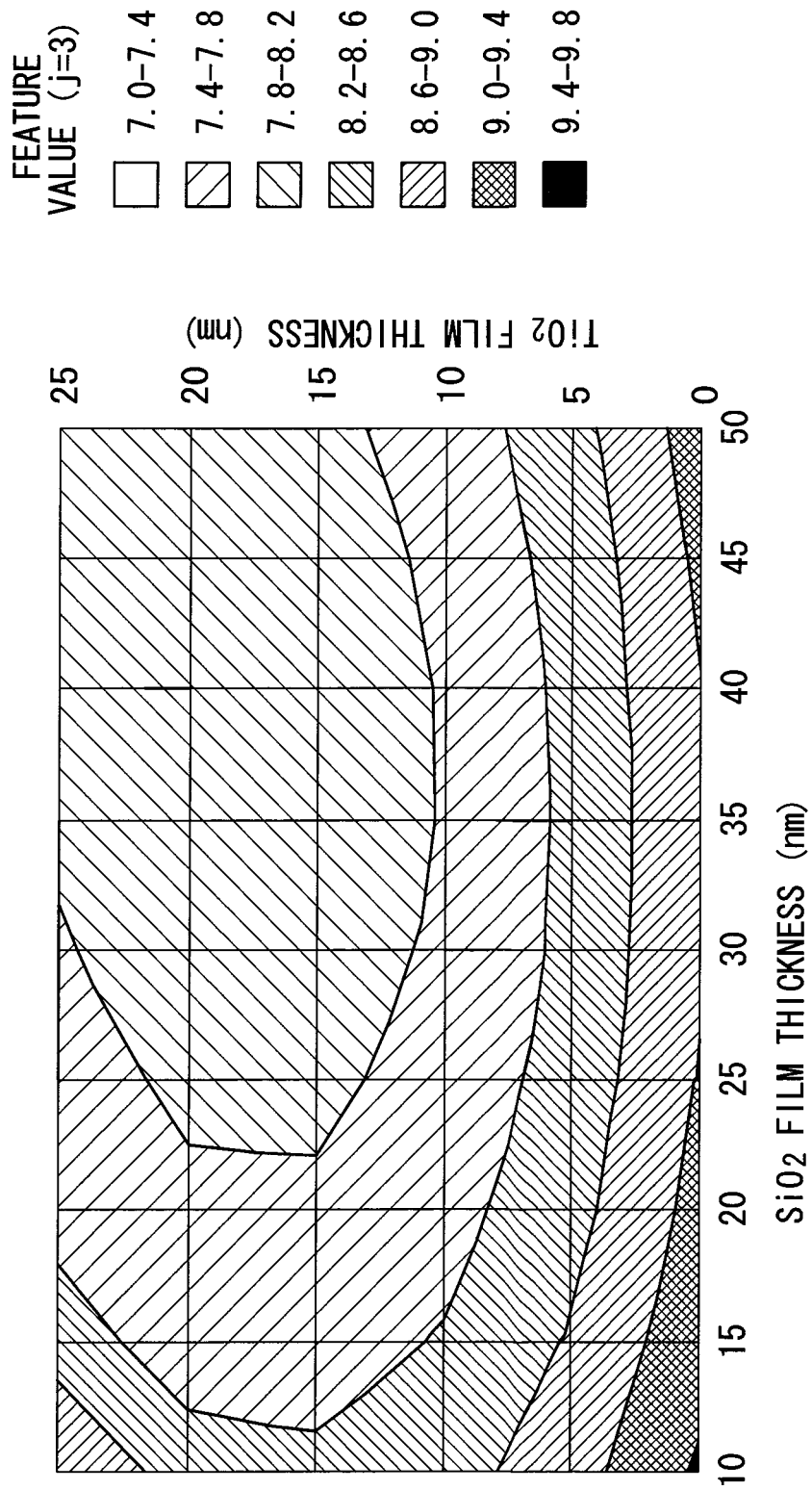
FIG. 6 is a diagram showing an example feature-value characteristic for a feature value "the average reflectance at wavelengths from 500 nm to 900 nm, inclusive".
Figure 7:
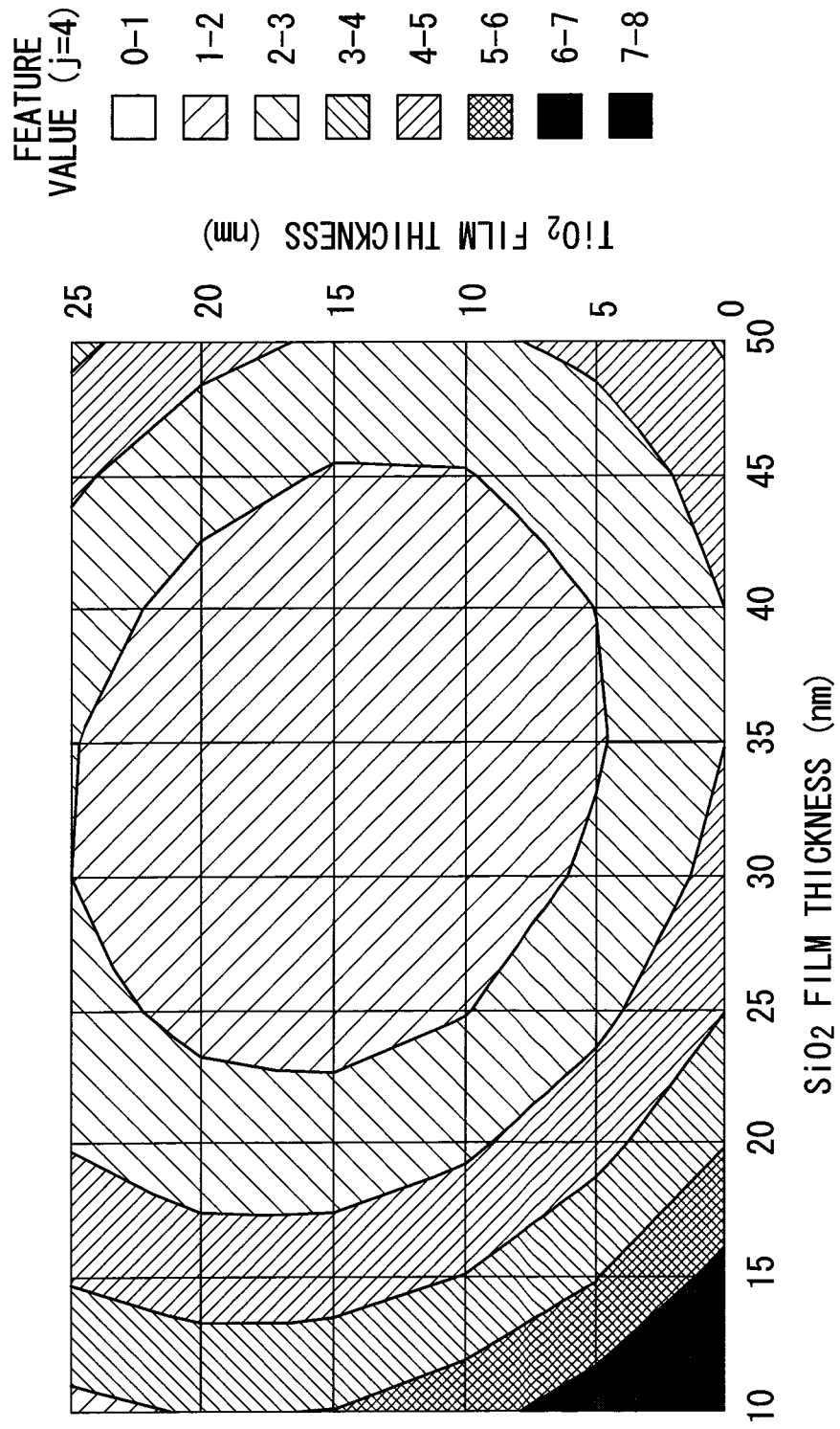
FIG. 7 is a diagram showing an example feature-value characteristic for a feature value "the difference between the maximum reflectance and the minimum reflectance at wavelengths from 550 nm to 700 nm, inclusive".
Figure 8:
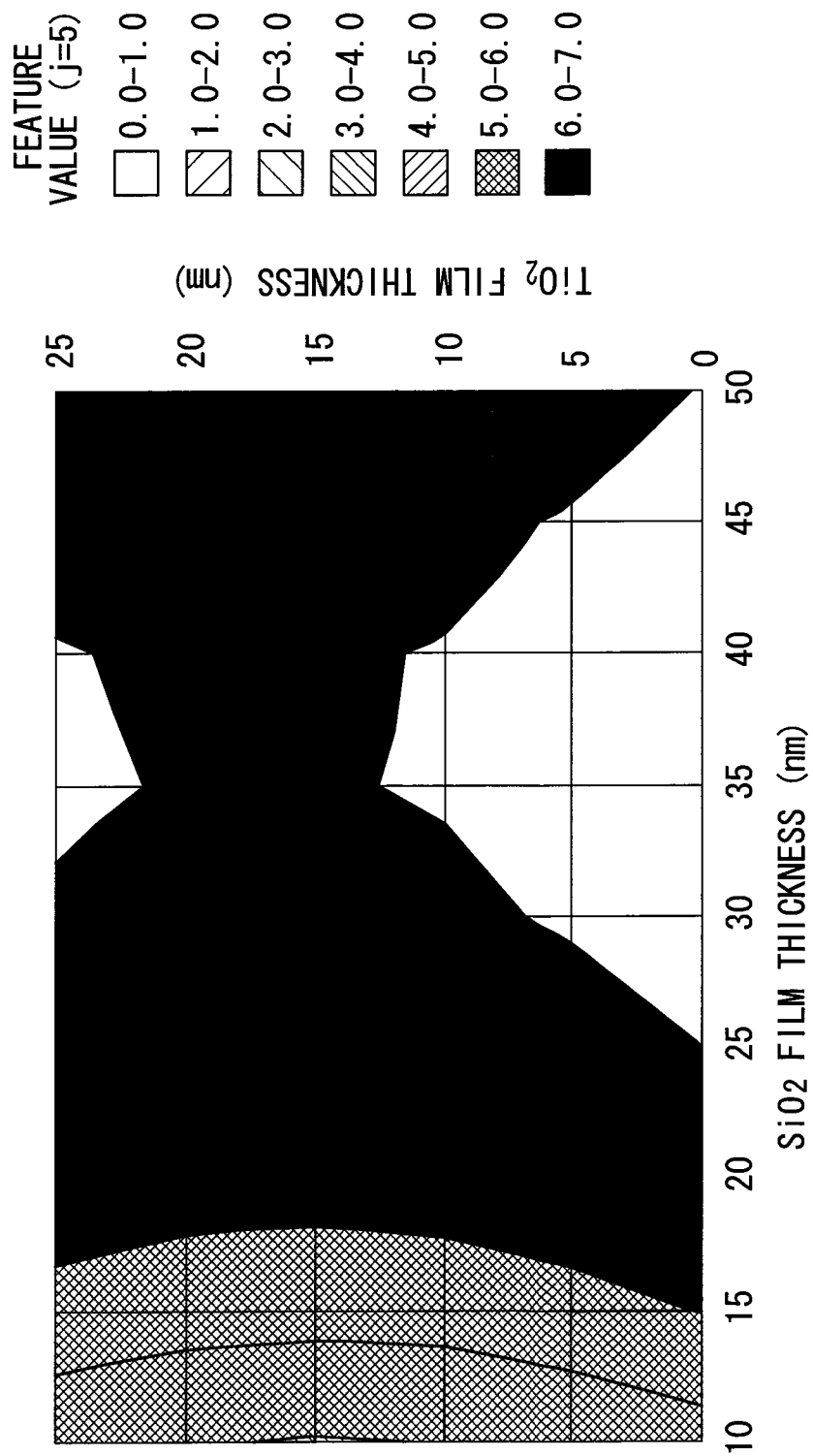
FIG. 8 is a diagram showing an example feature-value characteristic for a feature value "the minimum reflectance at wavelengths from 550 nm to 700 nm, inclusive".
Figure 9:
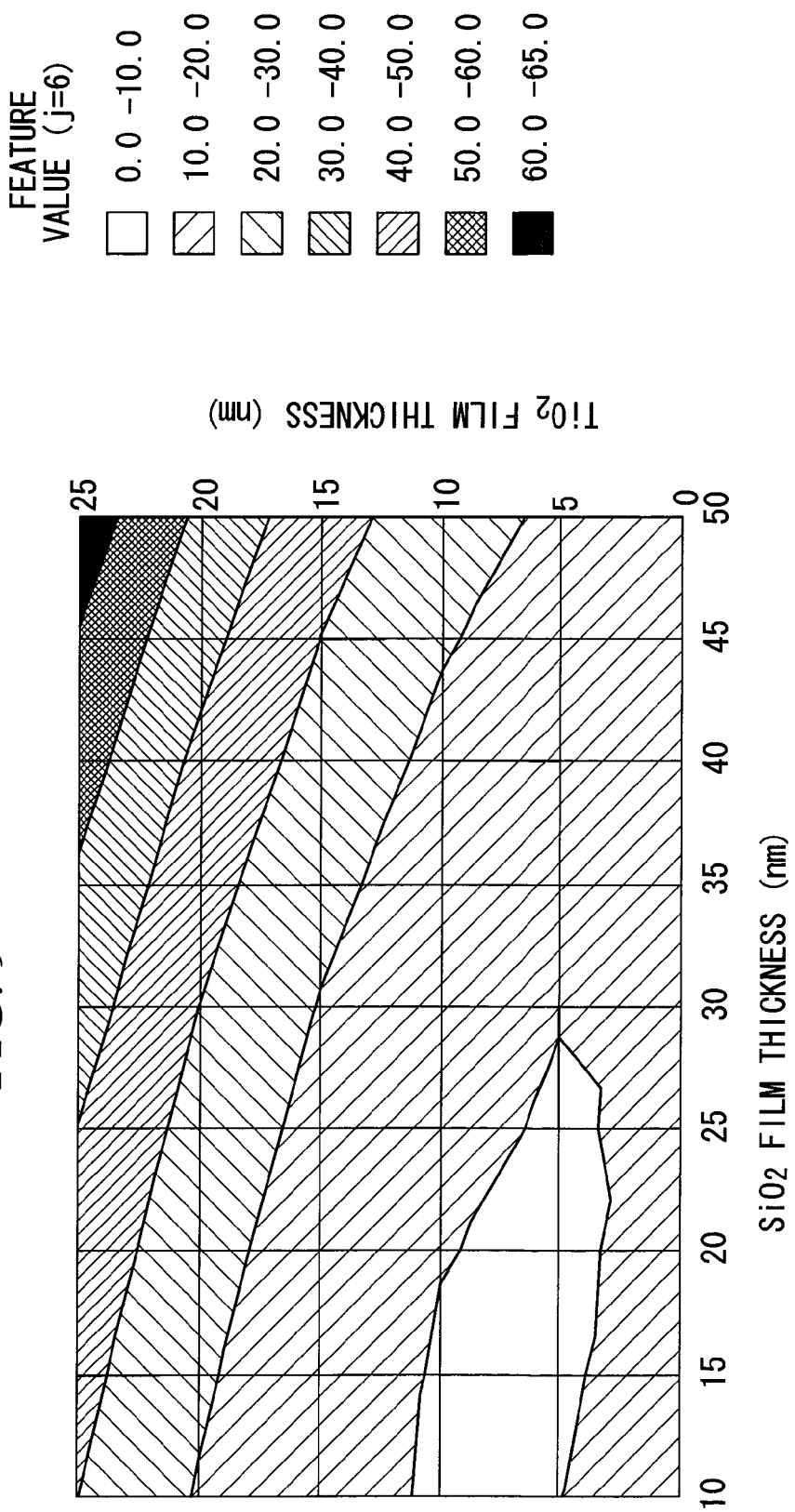
FIG. 9 is a diagram showing an example feature-value characteristic for a feature value "the maximum reflectance value".

FIGS. 4 to 9 are graphs showing the first to sixth (j=1 to 6) feature-value characteristics. FIG. 4 shows an example feature-value characteristic for the feature value "reflectance at a wavelength of 380 nm"; FIG. 5 shows an example feature-value characteristic for the feature value "the difference between the maximum reflectance and the minimum reflectance at wavelengths from 900 nm to 1200 nm, inclusive"; FIG. 6 shows an example feature-value characteristic for the feature value "the average reflectance at wavelengths from 500 nm to 900 nm, inclusive"; FIG. 7 shows an example feature-value characteristic for the feature value "the difference between the maximum reflectance and the minimum reflectance at wavelengths from 550 nm to 700 nm, inclusive"; FIG. 8 shows an example feature-value characteristic for the feature value "the minimum reflectance at wavelengths from 550 nm to 700 nm, inclusive"; FIG. 9 shows an example feature-value characteristic for the feature value "the maximum reflectance value". In FIGS. 4 to 9, the horizontal axis shows the film thickness of the second transparent thin film ($SiO_2$) 3, and the vertical axis shows the film thickness of the first transparent thin film ($TiO_2$) 2.

Next, a thin-film inspection method using the above-described feature-value characteristics will be described with reference to FIG. 2.

First, in actual inspection, at least two feature values of the six feature values shown in Table 1 are selected and used. Here, a description will be given of a case where the film thicknesses of the first transparent thin film 2 and the second transparent thin film 3 are calculated by using the feature-value characteristic for the first (j=1) feature value "reflectance at a wavelength of 380 nm" and the feature-value characteristic for the second (j=2) feature value "the difference between the maximum reflectance and the minimum reflectance at wavelengths from 900 nm to 1200 nm, inclusive".

First, in FIG. 2, the light irradiation section 11 is operated to irradiate the inspection-target substrate S with light from the transparent glass substrate side. Light reflected from the inspection-target substrate S is received by the substantially-spherical light receiving section 12, and information about the received reflected light is input to the arithmetic section 15. The arithmetic section 15 generates a spectral reflectance spectrum based on the input information about the reflected light and obtains, from this spectral reflectance spectrum, the reflectance at a wavelength of 380 nm and the difference between the maximum reflectance and the minimum reflectance at wavelengths from 900 nm to 1200 nm, inclusive.

Then, the arithmetic section 15 reads the first feature-value characteristic and the second feature-value characteristic stored in the storage section 14, and calculates the film thicknesses x and y that minimize the sum of squares of the difference between the measurement value and the value (hereinafter, referred to as "calculated feature value") obtained when the film thicknesses are input in units of nanometers as the values of x and y of these feature-value characteristics.

In short, the values of x and y that minimize W in Formula (3) below are calculated.

{Formula 3}

$$W = \sum_{j=1}^{n} (Z_j(x, y) - z_j)^2 \qquad (3)$$

In Formula (3), x indicates the film thickness of the first transparent thin film, y indicates the film thickness of the second transparent thin film, $Z_j(x,y)$ indicates the calculated value of the j-th feature value obtained by using Formula (2), $z_j$ indicates the measurement value of the j-th feature value, and n indicates the number of feature values.

Specifically, because the first and second feature values are used in this embodiment, Formula (3) is expressed as in Formula (4).

{Formula 4}

$$W=(Z_1(x,y)-z_1)^2+(Z_2(x,y)-z_2)^2 \qquad (4)$$

In Formula (4), $Z_1(x,y)$ indicates the calculated feature value of the first feature value, $z_1$ indicates the measurement value of the first feature value, $Z_2(x,y)$ indicates the calculated feature value of the second feature value, and $z_2$ indicates the measurement value of the second feature value.

Then, when x and y that minimize W are calculated, the calculated value of x is output as the film thickness of the first transparent thin film, and the calculated value of y is output as the film thickness of the second transparent thin film. Then, the film thicknesses of the thin films are displayed, for example, on the display unit or the like when film-thickness information is obtained from the arithmetic expression.

As described above, according to the thin-film inspection apparatus and the method therefor of this embodiment, at least two feature values are selected from among the feature values in the spectral reflectance spectrum, which are affected by a variation in the film thickness of at least one of the first transparent thin film 2 and the second transparent thin film 3, and the film thicknesses of the first transparent thin film 2 and the second transparent thin film 3 are calculated by using the selected feature values; therefore, even when a plurality of thin films have been laminated, specifically, even when a transparent conductive film has been laminated on the measurement-target reflectance-adjustment thin films, it is possible to calculate the film thicknesses of the thin films constituting the reflectance-adjustment layer based on the reflection characteristics of the thin films.

Furthermore, since light enters from the transparent glass substrate side, it is possible to reduce the interference of light caused by the unevenness formed on the surface of the transparent conductive film. Specifically, if illumination light is irradiated from the transparent conductive film side to measure reflected light reflected from the film surface, light is scattered due to the unevenness (texture) formed on the upper surface of the transparent conductive film. Therefore, information about the texture (the magnitude of the Haze rate) is superimposed on the spectral reflectance spectrum, and this becomes a cause of error, reducing the accuracy of film-thickness measurement. In contrast, in this embodiment, since light enters from the transparent glass substrate side, it is possible to suppress an error caused by the unevenness on the surface of the transparent conductive film and to improve the measurement accuracy. Specifically, when light is irradiated from the glass substrate side, it is possible to measure the film thicknesses of the first transparent thin film and the second transparent thin film without being affected by the texture on the transparent conductive film because the spectral reflectance spectrum for a specimen has substantially the same shape irrespective of the texture formed on the upper surface of the transparent conductive film.

Furthermore, it is possible to measure the film thicknesses of the first transparent thin film and the second transparent thin film, constituting the reflectance-adjustment layer, in the state where the transparent conductive film has been laminated on the reflectance-adjustment layer; therefore, the thin-film inspection apparatus can be applied, for example, to fabrication lines of photoelectric conversion thin-film devices using such thin films, and improved efficiency of film-thickness inspection can be expected. Specifically, according to the thin-film inspection apparatus of this embodiment, it is possible to measure the film thickness of each of the films constituting the reflectance-adjustment layer by using, as an inspection-target substrate, the substrate output from a film-formation apparatus in which the reflectance-adjustment layer and the transparent conductive film are formed in this order on the transparent glass substrate; therefore, the thin-film inspection apparatus can be easily applied to fabrication lines of photoelectric conversion thin-film devices.

Furthermore, according to the thin-film inspection apparatus and the method therefor of this embodiment, feature values that are particularly sensitive to a variation in the film thickness of each of the first transparent thin film 2 and the second transparent thin film 3 are used; therefore, it is possible to further improve the thin-film film-thickness measurement accuracy.

In this embodiment, "reflectance at a wavelength of 380 nm" and "the difference between the maximum reflectance and the minimum reflectance at wavelengths from 900 nm to 1200 nm, inclusive" are used as feature values; however, the feature values to be used are not limited thereto, and at least two feature values can be selected from the six feature values shown in Table 1. For example, the measurement accuracy can be improved as more feature values are used.

Figure 10:
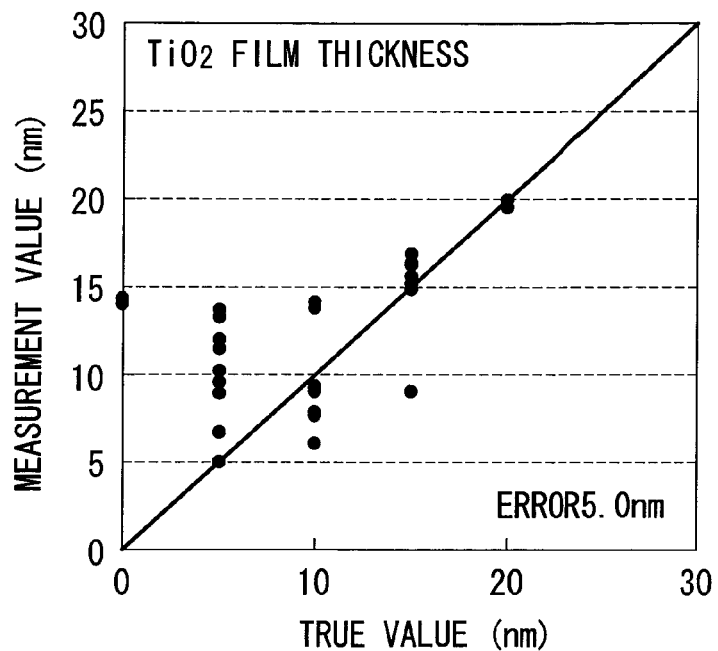
FIG. 10 is a graph showing a comparison between the actual film thickness (true value) and the measurement result obtained when "reflectance at a wavelength of 380 nm" and "the difference between the maximum reflectance and the minimum reflectance at wavelengths from 900 nm to 1200 nm, inclusive" are used as feature values.
Figure 11:
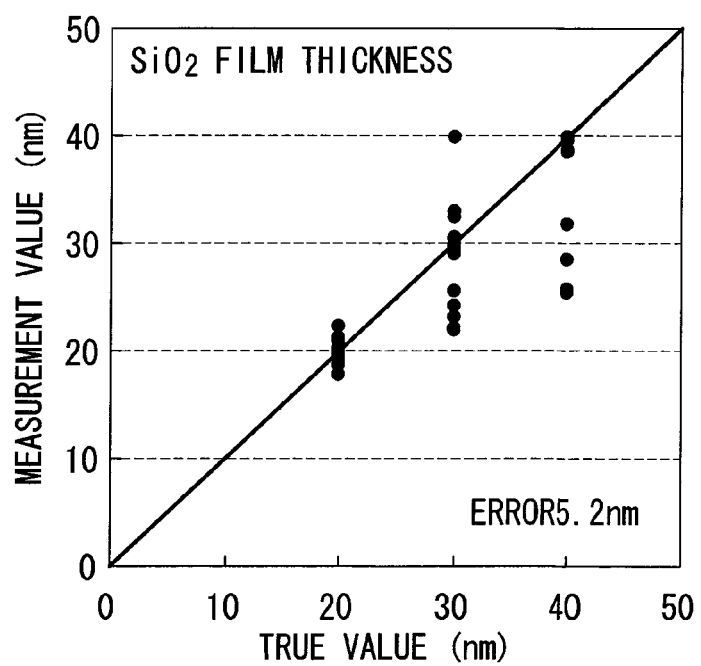
FIG. 11 is a graph showing a comparison between the actual film thickness (true value) and the measurement result obtained when "reflectance at a wavelength of 380 nm" and "the difference between the maximum reflectance and the minimum reflectance at wavelengths from 900 nm to 1200 nm, inclusive" are used as feature values.

For example, FIGS. 10 and 11 are graphs each showing a comparison between the actual film thickness (true value) and the measurement result obtained when "reflectance at a wavelength of 380 nm" and "the difference between the maximum reflectance and the minimum reflectance at wavelengths from 900 nm to 1200 nm, inclusive" are used as feature values.

FIG. 10 is a graph showing errors in measurement of the first transparent thin film 2, in which the horizontal axis shows the actual film thickness (true value) and the vertical axis shows the film thickness measured by the thin-film inspection apparatus of this embodiment. As shown in FIG. 10, the average film-thickness error with respect to the true value was 5.0 nm.

FIG. 11 is a graph showing errors in measurement of the second transparent thin film, in which the horizontal axis shows the actual film thickness (true value) and the vertical axis shows the film thickness measured by the thin-film inspection apparatus of this embodiment. As shown in FIG. 11, the average film-thickness error with respect to the true value was 5.2 nm.

Figure 12:
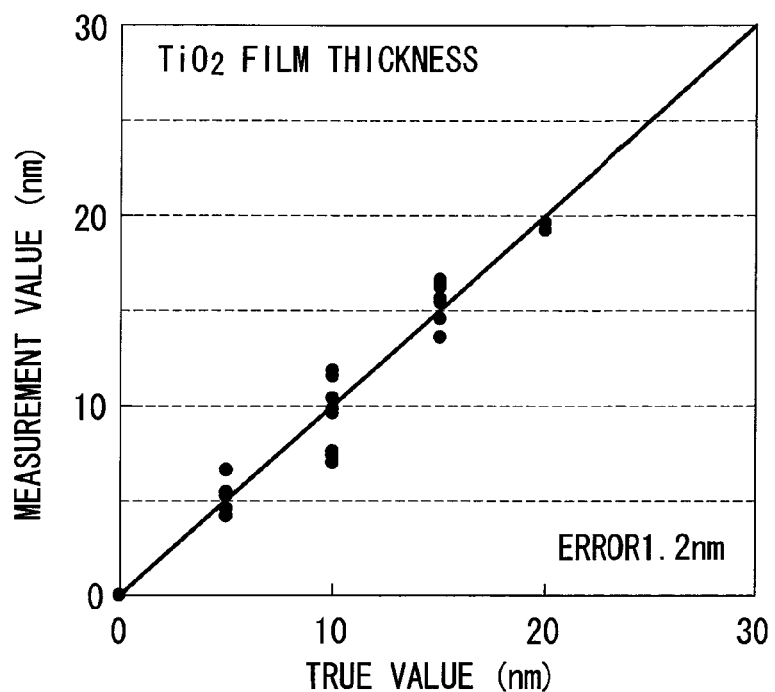
FIG. 12 is a graph showing a comparison between the actual film thickness and the measurement result obtained when all of the first to sixth feature values shown in Table 1 are used as feature values for film-thickness measurement.
Figure 13:
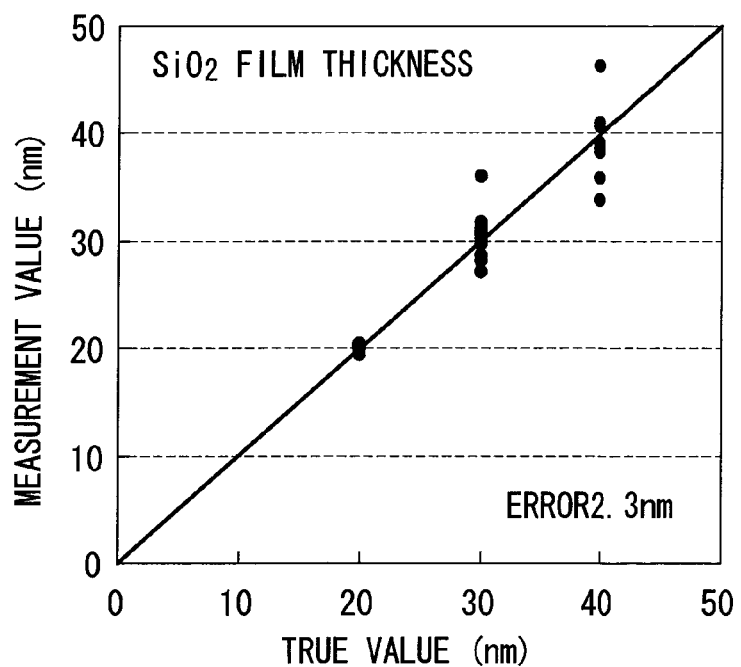
FIG. 13 is a graph showing a comparison between the actual film thickness and the measurement result obtained when all of the first to sixth feature values shown in Table 1 are used as feature values for film-thickness measurement.

FIGS. 12 and 13 are graphs each showing a comparison between the actual film thickness and the measurement result obtained when all of the first to sixth feature values shown in Table 1 are used as feature values for film-thickness measurement.

FIG. 12 is a graph showing errors in measurement of the first transparent thin film, in which the horizontal axis shows the actual film thickness (true value) and the vertical axis shows the film thickness measured by the thin-film inspection apparatus of this embodiment. As shown in FIG. 12, the average film-thickness error with respect to the true value was 1.2 nm.

FIG. 13 is a graph showing errors in measurement of the second transparent thin film, in which the horizontal axis shows the actual film thickness (true value) and the vertical axis shows the film thickness measured by the thin-film inspection apparatus of this embodiment. As shown in FIG. 13, the average film-thickness error with respect to the true value was 2.3 nm.

As described above, it was confirmed that the measurement accuracy can be improved when all of the feature values shown in Table 1 are used.

{Reference Signs List}

| | |
|---|---|
| 1 | transparent glass substrate |
| 2 | first transparent thin film |
| 3 | second transparent thin film |
| 4 | transparent conductive film |
| 11 | light emitting section |
| 12 | light receiving section |
| 13 | light dispersing section |
| 14 | storage section |
| 15 | arithmetic section |

The invention claimed is:

1. A thin-film inspection apparatus that calculates, for an inspection-target substrate in which a first transparent thin film and a second transparent thin film that are provided for reflectance adjustment and a transparent conductive film have been formed in this order on a transparent glass substrate, a film thickness of each of the first transparent thin film and the second transparent thin film, the apparatus comprising:

a storage section that stores at least two feature-value characteristics in which at least two feature values selected from feature values in a spectral reflectance spectrum that are affected by a variation in the film thickness of at least one of the first transparent thin film and the second transparent thin film are each associated with the film thickness of the first transparent thin film and the film thickness of the second transparent thin film;

a light irradiation section that irradiates the inspection-target substrate with white light through the transparent glass substrate;

a light receiving section that receives reflected light reflected from the inspection-target substrate; and an arithmetic section that obtains measurement values of the feature values stored in the storage section, from a spectral reflectance spectrum generated based on the reflected light received by the light receiving section, and that calculates the film thickness of each of the first transparent thin film and the second transparent thin film by using the obtained measurement values of the feature values and the feature-value characteristics stored in the storage section.

2. A thin-film inspection apparatus according to claim 1, wherein the feature-value characteristics stored in the storage section include reflectance at a wavelength at which the reflectance varies according to the film thickness of the first transparent thin film, or a maximum reflectance value.

3. A thin-film inspection apparatus according to claim 2, wherein the feature-value characteristics stored in the storage section further include any of the difference between maximum reflectance and minimum reflectance at wavelengths from approximately 900 nm to approximately 1200 nm, inclusive; average reflectance at wavelengths from approximately 500 nm to approximately 900 nm, inclusive; the difference between maximum reflectance and minimum reflectance at wavelengths from approximately 550 nm to approximately 700 nm, inclusive; and minimum reflectance at wavelengths from approximately 550 nm to approximately 700 nm, inclusive.

4. A thin-film inspection apparatus according to claim 3, wherein:

the feature-value characteristics are each expressed by using a polynomial in which the film thickness of the first transparent thin film and the film thickness of the second transparent thin film are variables; and the arithmetic section calculates the value of x as the film thickness of the first transparent thin film and the value of y as the film thickness of the second transparent thin film when W becomes minimum in Formula (1), {Formula 1}

$$W = \sum_{j=1}^{n} (Z_j(x, y) - z_j)^2 \quad (1)$$

where $Z_j(x,y)$ indicates a calculated value of a j-th feature value when a predetermined film thickness x of the first transparent thin film and a predetermined film thickness y of the second transparent thin film are input to a feature-value characteristic corresponding to the feature value; $z_j$ indicates a measurement value of the j-th feature value; and n indicates the number of feature-value characteristics stored in the storage section.

5. A thin-film inspection apparatus according to claim 2, wherein:

the feature-value characteristics are each expressed by using a polynomial in which the film thickness of the first transparent thin film and the film thickness of the second transparent thin film are variables; and the arithmetic section calculates the value of x as the film thickness of the first transparent thin film and the value of y as the film thickness of the second transparent thin film when W becomes minimum in Formula (1), {Formula 1}

$$W = \sum_{j=1}^{n} (Z_j(x, y) - z_j)^2 \quad (1)$$

where $Z_j(x,y)$ indicates a calculated value of a j-th feature value when a predetermined film thickness x of the first transparent thin film and a predetermined film thickness y of the second transparent thin film are input to a feature-value characteristic corresponding to the feature value; $z_j$ indicates a measurement value of the j-th feature value; and n indicates the number of feature-value characteristics stored in the storage section.

6. A thin-film inspection apparatus according to claim 1, wherein:

the feature-value characteristics are each expressed by using a polynomial in which the film thickness of the first transparent thin film and the film thickness of the second transparent thin film are variables; and the arithmetic section calculates the value of x as the film thickness of the first transparent thin film and the value of y as the film thickness of the second transparent thin film when W becomes minimum in Formula (1), {Formula 1}

$$W = \sum_{j=1}^{n} (Z_j(x, y) - z_j)^2 \quad (1)$$

where $Z_j(x,y)$ indicates a calculated value of a j-th feature value when a predetermined film thickness x of the first transparent thin film and a predetermined film thickness y of the second transparent thin film are input to a feature-value characteristic corresponding to the feature value; $z_j$ indicates a measurement value of the j-th feature value; and n indicates the number of feature-value characteristics stored in the storage section.

7. A thin-film inspection method for calculating, for an inspection-target substrate in which a first transparent thin film and a second transparent thin film that are provided for reflectance adjustment and a transparent conductive film have been formed in this order on a transparent glass substrate, a film thickness of each of the first transparent thin film and the second transparent thin film, the method comprising the steps of obtaining in advance at least two feature-value characteristics in which at least two feature values selected from feature values in a spectral reflectance spectrum that are affected by a variation in the film thickness of at least one of the first transparent thin film and the second transparent thin film are each associated with the film thickness of the first transparent thin film and the film thickness of the second transparent thin film;

irradiating the inspection-target substrate with white light through the transparent glass substrate;

receiving reflected light reflected from the inspection-target substrate;

obtaining measurement values of the feature values from a spectral reflectance spectrum generated based on the received reflected light; and calculating the film thickness of each of the first transparent thin film and the second transparent thin film by using each of the obtained measurement values of the feature values and the feature-value characteristics.

8. A thin-film inspection apparatus for calculating a film thickness of a first transparent thin film and a second transparent thin film of an inspection-target substrate in which the first transparent thin film, the second transparent thin film provided for reflectance adjustment, and a transparent conductive film are formed in an order accordingly on a transparent glass substrate, the apparatus comprising:

a storage section storing at least two feature-value characteristics in which at least two feature values selected from feature values in a spectral reflectance spectrum that are affected by a variation in the film thickness of at least one of the first transparent thin film and the second transparent thin film are each associated with the film thickness of the first transparent thin film and the film thickness of the second transparent thin film;

a light irradiation section irradiating the inspection-target substrate with white light through the transparent glass substrate;

a light receiving section receiving light reflected from the inspection-target substrate; and an arithmetic section to obtain measurement values of the feature values stored in the storage section from the spectral reflectance spectrum based on the reflected light received by the light receiving section, and to calculate the film thickness of each of the first transparent thin film and the second transparent thin film by using the obtained measurement values of the feature values and the feature-value characteristics stored in the storage section.

\* \* \* \* \*